United States Patent

[11] 3,608,979

| [72] | Inventor | John Cadden Coyle<br>Wybunbury, near Nantwich, England |
|---|---|---|
| [21] | Appl. No. | 801,538 |
| [22] | Filed | Feb. 24, 1969 |
| [45] | Patented | Sept. 28, 1971 |
| [73] | Assignee | Rolls-Royce Limited<br>Derby, England |
| [32] | Priority | Mar. 6, 1968 |
| [33] | | Great Britain |
| [31] | | 10,921/68 |

[54] APPARATUS FOR INDICATING CHANGES IN ANGULAR VELOCITY, AND VEHICLE BRAKING SYSTEMS EMPLOYING SUCH APPARATUS
19 Claims, 12 Drawing Figs.

[52] U.S. Cl. .................................................. 303/21 EB,
303/20, 324/70 A
[51] Int. Cl. ................................................... B60t 8/08
[50] Field of Search .......................................... 303/20, 21
A, 21 AF, 21 B, 21 BE, 21 BB, 21 EB; 324/70 A

[56] References Cited
UNITED STATES PATENTS

| 3,026,148 | 3/1962 | Ruof .......................... | 303/21 BE |
| 3,260,555 | 7/1966 | Packer ....................... | 303/21 BB |
| 3,398,995 | 8/1968 | Martin ....................... | 303/21 AA |
| 3,469,662 | 9/1969 | Dewar ........................ | 303/21 BE |

*Primary Examiner*—Duane A. Reger
*Attorney*—Cushman, Darby & Cushman

ABSTRACT: An apparatus for indicating changes in the angular velocity of a rotating body subjected to acceleration or deceleration, e.g. an automobile, has a velocity sensor producing an output having a frequency proportional to the angular velocity, a frequency-to-DC converter, a differentiator, a comparator for comparing the differentiated signal with a reference signal and for producing an output signal whenever the signals compared differ by a predetermined magnitude, which may be indicative of the onset of wheel-locking, and an actuator for reducing the deceleration (braking force) on the body in response to the comparator output signal.

PATENTED SEP 28 1971

Inventor
JOHN CRITTEN COYLE

By
Cushman, Darby & Cushman
Attorneys

APPARATUS FOR INDICATING CHANGES IN ANGULAR VELOCITY, AND VEHICLE BRAKING SYSTEMS EMPLOYING SUCH APPARATUS

This invention relates to apparatus for indicating changes in angular velocity, and to vehicle braking systems employing such apparatus.

According to one aspect of the present invention, there is provided apparatus for indicating changes in the angular velocity of a rotating body which may be subjected to acceleration/deceleration, said apparatus comprising velocity sensing means including a toothed disc at least partly made of ferromagnetic material secured to said body for rotation therewith and a variable reluctance transducer cooperating with said disc and adapted to produce an electric signal the frequency of which is proportional to the angular velocity of said body, a converter for converting said signal to a direct current signal the level of which may vary with variations in said frequency, a differentiator for differentiating said direct current signal, said differentiator including a circuit arrangement adapted in operation to differentiate relatively low frequency signals and to integrate relatively high frequency signals, and a comparator for comparing the differentiated signal with a reference signal derived from an external source, said comparator being arranged to produce a output signal whenever the two signals compared differ by at least a predetermined magnitude, said output signal being usable to actuate means adapted to reduce the acceleration/deceleration of said body.

According to a second aspect of the present invention there is provided an apparatus for indicating changes in the angular velocity of a rotating body which may be subjected to acceleration/deceleration, said apparatus comprising velocity sensing means adapted to produce an electric signal the frequency of which is proportional to the angular velocity of said body, a converter for converting said signal to a direct current signal the level of which may vary with variations in said frequency, a differentiator for differentiating said direct current signal, said differentiator including a circuit arrangement adapted in operation to differentiate relatively low frequency signals and to integrate relatively high frequency signals, and a comparator for comparing the e differentiated signal with a reference signal derived from an external source, said comparator being arranged to produce an output signal whenever the two signals compared differ by at least a predetermined magnitude, said output signal being usable to actuate means adapted to reduce the acceleration/deceleration of said body, and wherein the said circuit arrangement includes a high gain operation amplifier, an input resistor and an input capacitor connected in series, and a feedback resistor and a feedback capacitor connected in parallel with each other and across the amplifier, the time constant of the input resistor and feedback capacitor on the one hand, and of he feedback resistor and input capacitor on the other hand are made approximately equal and intermediate the said relatively low and high frequencies.

According to a yet further aspect of the present invention there is provided an apparatus for indicating changes in the angular velocity of a rotating body which may be subjected to acceleration/deceleration, said apparatus comprising velocity sensing means adapted to produce an electric signal the frequency of which is proportional to the angular velocity of said body, a converter for converting said signal to a direct current signal the level of which may vary with variations in said frequency, a differentiator for differentiating said direct current signal, said differentiator including a circuit arrangement adapted in operation to differentiate relatively low frequency signals and to integrate relatively high frequency signals, a comparator for comparing the differentiated signal with a reference signal derived from an external source, said comparator being arranged to produce an output signal whenever the two signals compared differ by at least a predetermined magnitude, said output signal being usable to actuate means adapted to reduce the acceleration/deceleration of said body, and a Miller integrator circuit which is connected to receive the output of said circuit arrangement and the output of which is passed to said comparator.

According to a still further aspect of the present invention there is provided a hydraulic braking system for a motor car having four braked wheels, solenoid valves being located in the said hydraulic braking system. There being at least one solenoid valve for each braked wheel, including apparatus for indicating changes in the angular velocity of apparatus for indicating changes in the angular velocity of a braked road wheel which may be subjected to deceleration, said apparatus comprising velocity sensing means adapted to produce an electric signal the frequency of which is proportional to the angular velocity of said wheel, a converter for converting said signal to a direct current signal the level of which may vary with variations in said frequency, a differentiator for differentiating said direct current signal, a comparator for comparing the differentiated signal with a reference signal derived from an external source, said comparator being arranged to produced an output signal whenever the two signal compared differ by at least a predetermined magnitude, said predetermine magnitude being indicative of the onset of wheel-locking, said output signal being used in operation to energize the said solenoid valves to relieve the braking force applied to said wheels, and a logic circuit, the said circuit being arranged to deenergize the system in case of failure and optionally to provide a warning indication also.

According to a yet further aspect of the present invention there is provided a vehicle having a vehicle body, four road wheels and a braking system including apparatus associated with at least some of the braked road wheels for indicating changes in the angular velocity of a wheel which may be subjected to deceleration, said apparatus comprising velocity sensing means adapted to produce an electric signal the frequency of which is proportional to the angular velocity of said wheel, a first converter for converting said signal to a direct current signal the level of which may vary with variations in said frequency, a differentiator for differentiating said direct current signal, a decelerometer secured to the vehicle body, a filter for filtering the output of the decelerometer to remove therefrom components deriving from the mechanical vibrations of the vehicle body, a second converter to provide a voltage analogue signal of the deceleration of the vehicle body, and a comparator for comparing the differentiated signal with the voltage analogue signal, said comparator being arranged to produce an output signal whenever the two signals compared differ by at least a predetermined magnitude, said predetermined magnitude being indicative of the onset of wheel-locking, said output signal, being used in operation to relieve the braking force applied to said wheel wheels.

In a preferred embodiment, said converter includes a diode pump circuit.

According to another aspect of the present invention, there is provided a vehicle braking system including apparatus for indicating changes in angular velocity as set forth above, wherein said apparatus is associated with at least some of the braked road wheels of the vehicle, said output signal being used in operation to relieve the braking force applied to said wheels, said predetermined magnitude being indicative of the onset of wheel-locking.

In a preferred embodiment, said vehicle is a motor car having four braked wheels, the arrangement for using said output signal being such that the brakes of both wheels at one end of the car are released when either wheel is about to lock at that end. Alternatively, the arrangement for using said output signal is such that the brake or brakes of each wheel may be released independently of the brakes of the other wheels when said wheel is about to lock.

Preferably, said output signal is used to energize solenoid valves located in the hydraulic brake system of the car, there being at least one solenoid valve for each braked wheel.

Said hydraulic brake system may include two independent power-operated circuits and a brake pedal actuated master cylinder circuit.

Each braked wheel may be provided with at least one opposed pair of brake caliper pistons which are independently operable.

The solenoid valve associated with the master cylinder may be electrically controlled to operate once only for each brake application and to stay energized while the brake pedal is depressed.

Preferably, a logic circuit is provided, the said circuit being arranged to deenergize the system in case of failure and optionally to provide a warning indication also.

The reference signal may be derived from a vehicle power supply independent of said sensing means.

Preferably said power supply is a battery, means being provided for stabilizing its output.

In an alternative arrangement, the reference signal may be derived from the output signal of a decelerometer secured to the vehicle body. The output signal of said decelerometer may be passed through a filter to remove therefrom components deriving from the mechanical vibrations of the vehicle body and converted to provide a voltage analogue signal of the deceleration of the vehicle body, said voltage analogue signal being then passed to said comparator.

The invention also includes a vehicle, e.g. a motor car, provided with a vehicle braking system as set fourth above.

The invention will be illustrated, merely by way of example, with reference to the accompanying drawings, in which.

Figure 1:
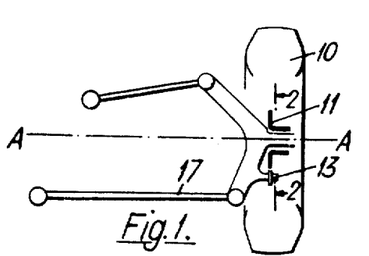
FIG. 1 is a diagrammatic section of a motor car road wheel provided with speed sensing means forming part of the apparatus for indicating changes in angular velocity of said wheel according to the present invention.
Figure 2:
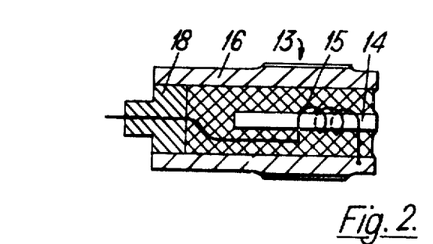
FIG. 2 is a sectional view taken on the line 2—2 of FIG. 1, on an enlarge scale, and with the distance between the two components much exaggerated for the sake of clarity.

Referring first to FIGS. 1 and 2, there is shown apparatus for indicating changes in angular velocity of a rotating body 10, e.g. a braked road wheel of a motor car, which rotates about an axis A—A. Mounted for rotation with the wheel 10 is a disc 11 having a plurality of equiangularly spaced apart slots 12 formed in its periphery. The disc 11 may be made from a ferromagnetic material, or alternatively it may be made from a nonmagnetic material with the parts between adjacent pairs of slots 12 being made of ferromagnetic insert material. In a preferred embodiment, there are 60 slots 12 provided around the periphery of the disc 11.

The disc 11 is adapted to rotate at a small distance, e.g. of the order of 0.030 to 0.050, from a transducer 13 which is stationary with respect to the disc 11. The transducer 13 consists of a rod magnet 14 around which a number of turns of a coil 15 has been wound. The magnet 14 and the coil 15 are surrounded by a cylindrical steel body 16 adapted to be secured to stationary vehicle structure, illustrated at 17 in FIG. 1, which structure may form part of the suspension system of the vehicle. The space between the body 16 and the magnet 14 and coil 15 is filled with an epoxy resin compound such as "Araldite" (Trade Mark). The end of the transducer 13 remote from the disc 11 is provided with a connecting socket 18 which is connected to the coil 15.

It will be appreciated that each time a slot 12 passes the transducer 13, the reluctance of the transducer 13 will be altered and this will cause a voltage to be induced in the coil 15. The frequency of the induced voltage will be proportional to the frequency of rotation of the slotted disc 11 and thus to wheel r.p.m. The normal angular velocity range of the wheel 10 is between 0 to 25 revolutions per second, and thus with the number of slots 11 being 60 in the preferred embodiment, the velocity sensing means of the present invention, constituted by the disc 11 and the transducer 13, can operate up to 1,500 Hz.

Figure 3:
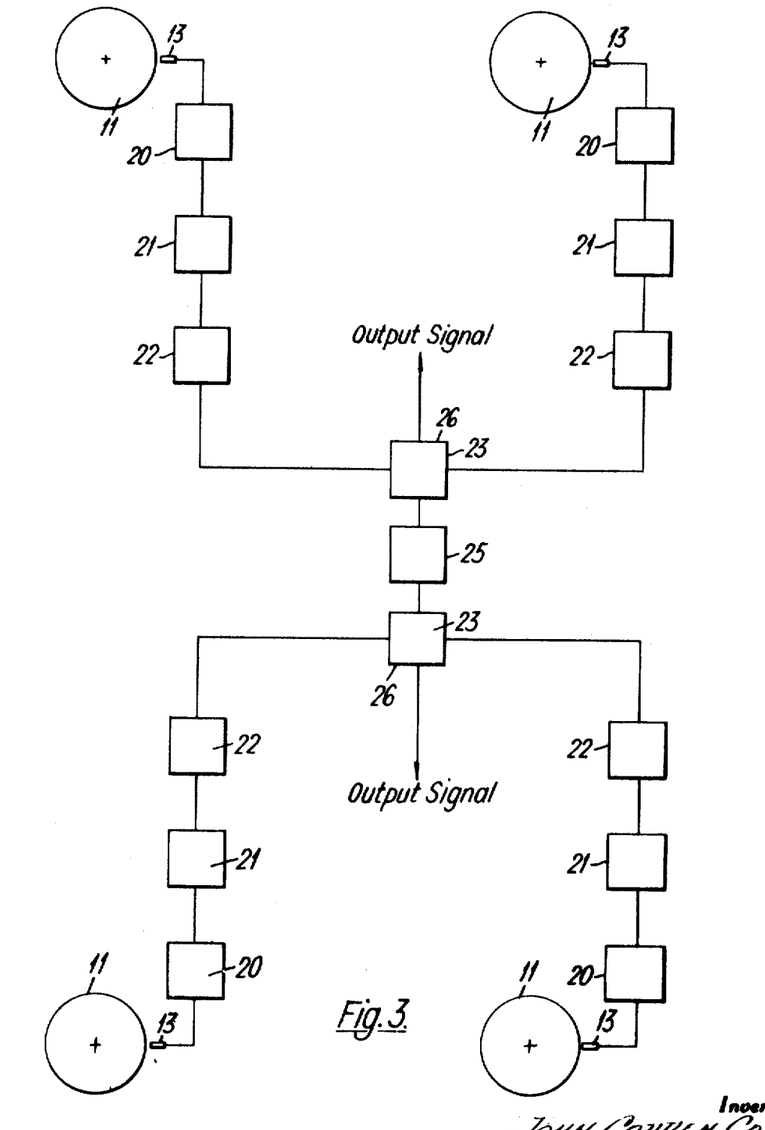
FIG. 3 is a block diagram of the electronic circuit for a vehicle braking system in accordance with the present invention, in which system the brakes of both wheels at one end of the vehicle are released if either wheel locks at that end of the vehicle.

FIG. 3 shows the electronic circuit incorporating the speed sensing means of FIGS. 1 and 2 as applied to a vehicle braking system having four braked wheels each of which is fitted with a slotted disc 11 and a transducer 13. The output signal from each transducer 13 passes to a converter 20 which is a frequency-to-DC converter, a preferred example thereof being illustrated in FIG. 7, and described below. Thus the converter 20 produces a direct-current voltage analogue of the angular velocity of the wheels 10. The signal from the converter 20 passes through a filter and buffer stage 21. The filter serves to remove the remaining high frequency voltage component at the slot frequency of the rotating disc 11, that has bypassed the frequency-to-voltage converter 20, and the buffer serves to match the output of the converter 20 to the input of a differentiator 22 to which the signal is next passed.

One preferred arrangement of a differentiator and filter circuit will be described below, in connection with FIG. 9.

The differentiator 22 is provided to differentiate the DC signal from the converter 20 the level of which, of course, will vary with variations in the angular velocity of the wheel 10 and thus the disc 11. The output from the differentiator 22 provides a signal which is proportional to the angular deceleration of the disc 11 and for a linear system this may be calibrated in volts/g. From the differentiator 22 the signal is passed to a comparator 23. One preferred embodiment of a comparator is illustrated in, and described with reference to, FIG. 8 below.

In the comparator 23 the signal is compared with a known constant-value reference signal to "decide" whether or not any of the road wheels 10 are about to lock.

In the FIG. 3 embodiment, two comparators 23 are provided, each of which is fed from the outputs of the two slotted discs 11 at the same end of the vehicle. Each comparator receives the reference voltage from the block generally indicated at 25. There are two methods envisaged for providing this reference voltage which will be described below. Each comparator 23 will compare the signal it receives from its two differentiators 22 and if this signal exceeds the reference voltage from 25 by an amount equal to or greater than a predetermined magnitude, it will provide an output signal to a solenoid valve forming part of the hydraulic braking system of the vehicle to release the two wheels 10 at the appropriate end of the vehicle for a period of time sufficient to allow the wheels 10 to accelerate up to their free-rolling speed.

Thus it will be seen that in the FIG. 3 embodiment, if either wheel at one end of the vehicle is about to lock, the brakes on both wheels at that end will be released. If desired, it may be arranged to feed each comparator 23 from a propeller shaft of the motor vehicle common to two of the road wheels.

Figure 4:
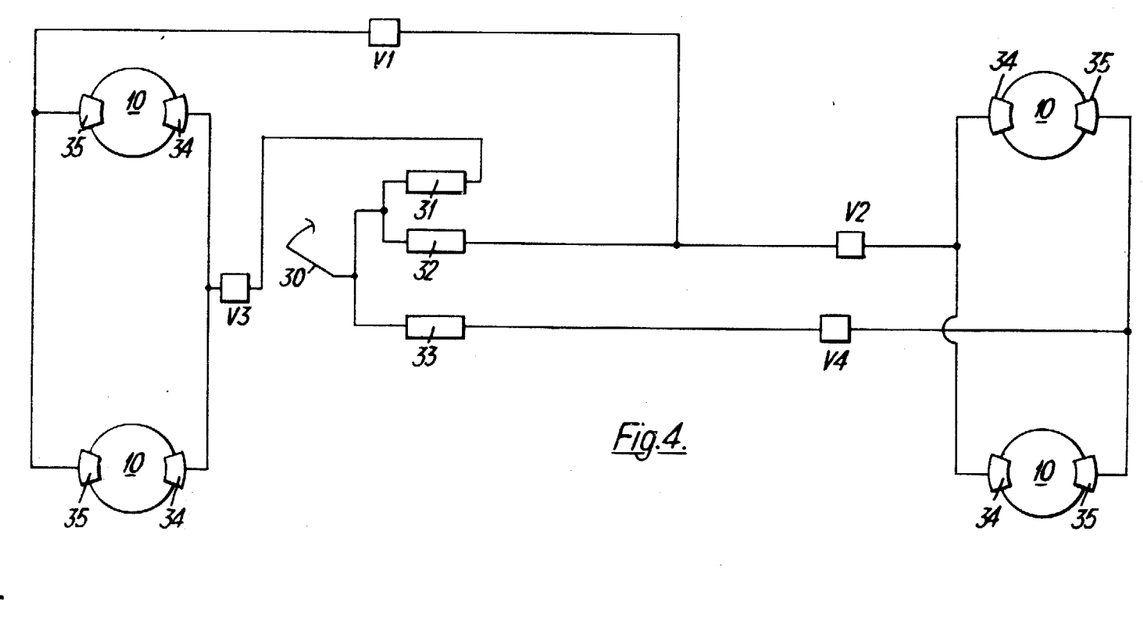
FIG. 4 is a diagrammatic illustration of a hydraulic circuit for the brake system of FIG. 3.

Turning now to FIG. 4, there is shown a hydraulic circuit of a motor car braking system having two independent full power operated hydraulic lines and one master cylinder line. A brake pedal is shown diagrammatically at 30 depression of which actuates two brake valves 31, 32 and a master cylinder 33.

Depression of the brake pedal 30 also operates to feed high pressure fluid from an external high pressure fluid source (not shown) to the brakes by operating the two brake valves 31, 32. Each wheel 10 is equipped with two opposed pairs of brake caliper pistons shown diagrammatically at 34 and 35, the said pairs being operable independently.

As can be seen, the hydraulic circuit includes four solenoid valves respectively designated V1 to V4. When one of the two front wheels 10 is about to lock, the electronic system described with reference to FIG. 3 will energize solenoid valves V1 and V3, while when one of the rear wheels 10 is about to lock, the electronic system will energize solenoid valves V2 and V4. The solenoid valve V4 is connected to the master cylinder 33, whereas the valves V1 and V2 are connected to the brake valve 32, the remaining solenoid V3 being connected to brake valve 31. Thus the brake valve 31 will control the flow of hydraulic fluid through one pair of brake caliper pistons 34 on each front wheel 10; the brake valve 32 will control the flow of hydraulic fluid to the other pair of brake caliper pistons 35 on each front wheel 10 and to one pair of brake caliper pistons 34 on each rear wheel 10. The master cylinder 33 will control the remaining two pairs of brake caliper pistons 35 on the rear wheels 10.

When a solenoid valve is energized, it will shut off the fluid supply to the brakes and at the same time reduce the pressure in the brake calipers by releasing some fluid from them back to the fluid reservoir (not shown) by return pipes (not shown). On deenergizing the solenoid valves, high-pressure fluid is once again supplied to the caliper pistons 34, 35. It will therefore be appreciated that during operation of the brake system when the brake pedal 30 is depressed, there will be a flow of hydraulic pressure fluid through the hydraulic circuit. This, however, is undesirable as far as the master cylinder line is concerned, because each operation of the solenoid valve V4 will drain a small amount of hydraulic fluid from the master cylinder 33 and if this were unchecked, the brake pedal 30 will gradually sink to the floor of the vehicle. In order to overcome this defect and in order to avoid any "pumping" effect on the pedal 30, a switch 26 is provided in the electrical circuit controlling the master cylinder solenoid valve V4 which allows this solenoid valve V4 to operate once only for each depression of the brake pedal 30. Each switch 26 has been shown as being part of the comparator "block" 23, merely for convenience. Once the brake pedal 30 is depressed, the solenoid valve V4 will remain energized until the load is taken off the brake pedal 30.

Figure 5:
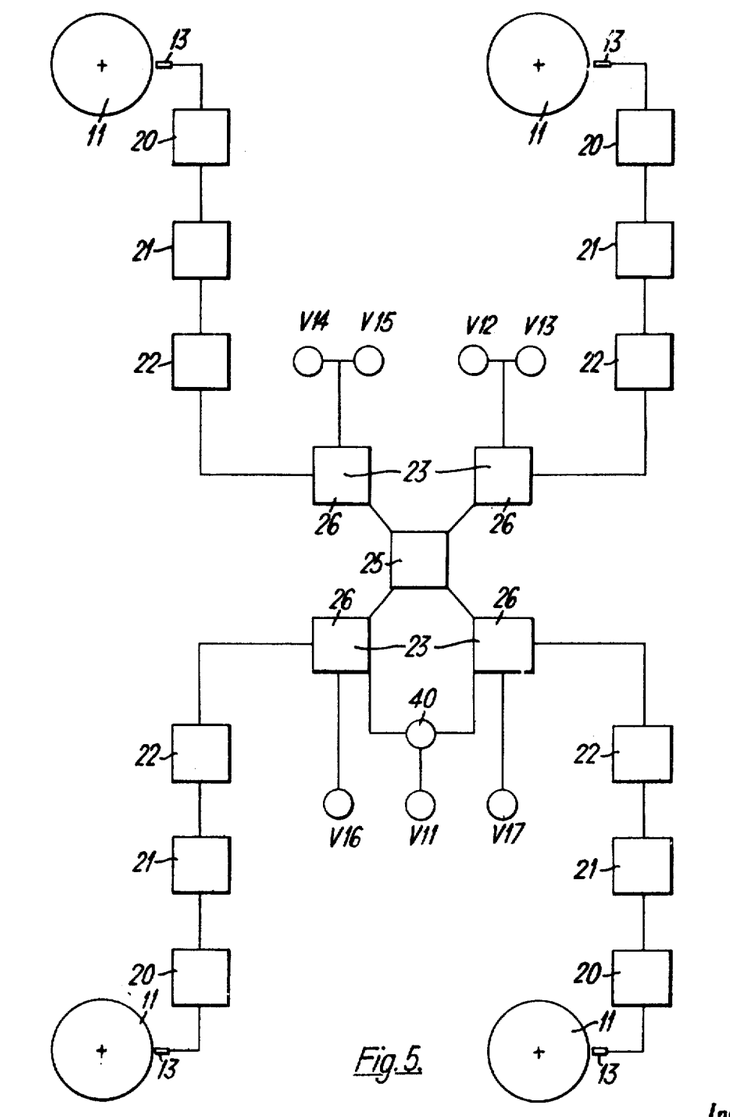
FIG. 5 is a block diagram similar to FIG. 3 but modified to show a braking system in which the brakes for each wheel are entirely independently operated of the other wheels of the vehicle.

FIG. 5 illustrates a modification of the system shown in FIG. 3, the embodiment of FIG. 5 constituting a refinement in that each speed sensing means constituted by the slotted disc 11 and the transducer 13 is effective to relieve the brake application to its respective wheel 10 when that wheel is about to lock, independently of the other road wheels of the vehicle.

In FIG. 5, parts similar to corresponding parts in FIG. 3 have been given the same reference numerals. It will thus be seen that the output from each transducer 13 passes to a frequency-to-DC converter 20, the output of which is passed to a filter and buffer 21 the thence to a differentiator 22. The output from each of the four differentiators 22 is passed to a respective comparator 23. The reference voltage is introduced into the system at 25 and is supplied to each of the four comparators 23. Each block showing the comparator 23 also includes a switch 26 as described with reference to FIG. 3.

FIG. 5 also illustrates a number of solenoid valves V11-V17 forming part of the hydraulic circuit illustrated in FIG. 6 and described with reference thereto. However, it will be noted that the output from one of the comparators 23 controls the action of solenoid valves V14 and V15, another comparator 23 controls the action of solenoid valves V12 and V13, yet another comparator 23 controls the action of solenoid valve V17 and a further comparator controls the action of solenoid valve V16.

It will also be noted that the two comparators 23 shown in the lower half of FIG. 5 (as viewed) are connected to a solenoid valve V11 which, as will be described below, is similar to the valve V4 of FIG. 4, the two said comparators being connected to the valve V11 via a slug relay 40. The role of the relay 40 is to prevent feedback from either one of the said two lower comparators 23 to the other said comparator but it will act to supply current to the solenoid valve V11 if either the solenoid valve V16 of the solenoid valve V17 is energized.

Figure 6:
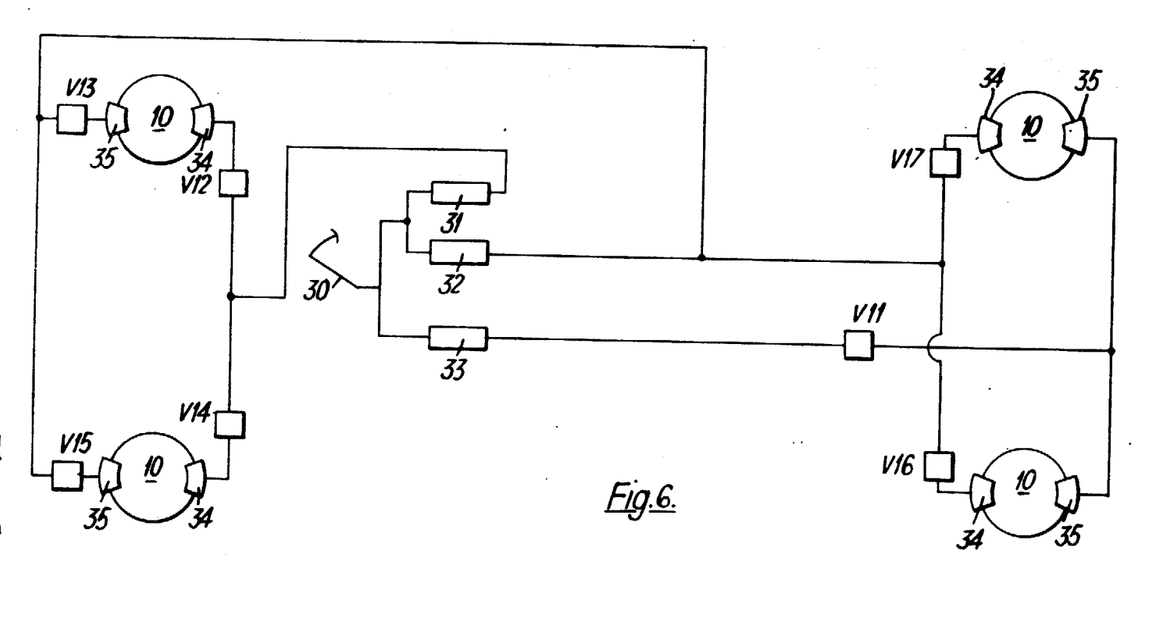
FIG. 6 is a diagrammatic illustration of the hydraulic circuit associated with the electric circuit of FIG. 5, FIGS. 7 and 8 are circuit diagrams of the converter and comparator, respectively, forming part of the electronic circuit of FIG. 3 or FIG. 6.

Turning now to FIG. 6, the hydraulic circuit associated with the electronic circuit of FIG. 5 has certain parts similar to the circuit illustrated in FIG. 4 and these parts have been allotted similar reference numerals. As it will be seen, the brake valve 31 will supply hydraulic pressure fluid to the solenoid valves V12 and V14, the brake valve 32 will supply hydraulic pressure fluid to the solenoid valves V13 and V15 as well as to the solenoid valves V16 and V17. The master cylinder 33 will supply hydraulic pressure fluid to the valve V11 which is similar to valve V4 of FIG. 4.

The solenoid valves V12 and V13 control the pairs of opposed caliper pistons 34, 35 of the right-hand front wheel and they are adapted to operate together. The solenoid valves V14 and V15 control the left-hand front wheel 10 of the vehicle and they are adapted to operate together. The solenoid valve V16 controls one pair of brake caliper pistons 34 of the left-hand rear wheel 10, while the solenoid valve V17 controls one pair of the brake caliper pistons 34 of the right-hand rear wheel. The other pair of caliper pistons 35 of the rear wheels 10 are controlled by the master cylinder 33 via the solenoid valve V11.

It is believed that no detailed explanation of the working of the system shown in FIGS. 5 and 6 is necessary in view of its similarity to the system of FIGS. 3 and 4. Briefly, however, it will be observed that if any one of the four wheels of the vehicle provided with a slotted disc 11 is about to lock, the signal from the disc 11 and transducer 13 will arrive at the relevant comparator 23 to operate the relevant solenoid valves to release the brake or brakes on that wheel.

Two separate methods of deriving a reference signal for the reference voltage input will now be described.

If the wheel deceleration exceeds a predetermined magnitude, this indicates that the wheel is about to lock. This predetermined magnitude is chosen to be just greater than the wheel deceleration which can be achieved without wheel locking under ideal conditions on a dry road surface with a high tire-to-road coefficient of friction. This chosen value of deceleration may be established electronically as a constant-value stabilized voltage derived from the car battery shown in FIG. 3. Stabilization may be achieved by the use of zener diodes.

Thus the comparators 23 compare this stabilized reference voltage with the voltage analogue of the wheel deceleration derived from the speed sensing unit 11, 13 and should the latter exceed this chosen magnitude, an output signal will be produced in the comparator 23 to operate a relevant solenoid valve to release the brake on the appropriate wheel or pairs of wheels.

Figure 12:
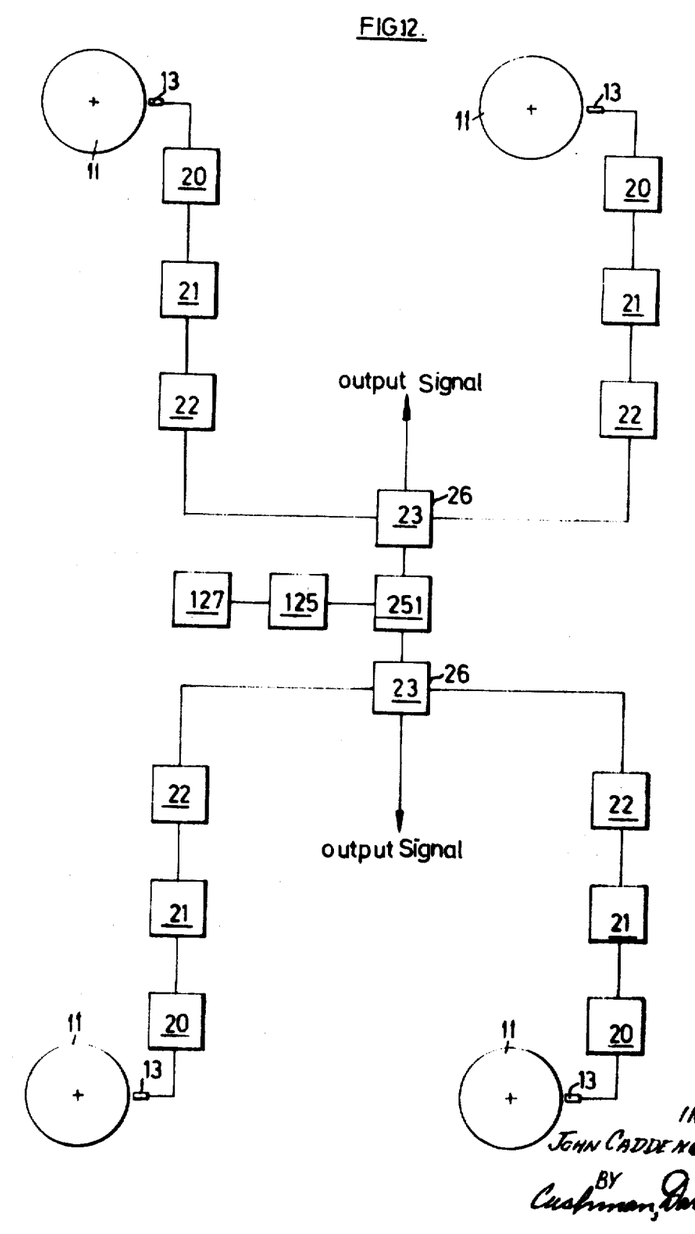
FIG. 12 is a block diagram showing an electronic circuit alternative to the circuit shown in FIG. 3.

The second method of establishing a constant-value reference signal, illustrated in FIG. 12, is provided by comparing the voltage analogue derived from the wheel deceleration with a voltage analogue derived from the deceleration of the vehicle body. Clearly while the wheels are not locked, the wheel deceleration and the vehicle body deceleration will be substantially proportional to each other within the limits of tire slip, but when a wheel locks, this proportionality is destroyed and the deceleration of the wheel will exceed the equivalent value of the body deceleration.

It is known that maximum vehicle body deceleration is achieved when there is approximately 15 to 20 percent slip between the tire and the road and therefore the amount by which the wheel deceleration is allowed to exceed vehicle body deceleration before the brakes are released is preferably chosen to be slightly above this value of slip In order to provide a vehicle body deceleration signal, a decelerometer 127 is secured to a suitable part of the vehicle body. The output from the decelerometer should preferably be filtered through filter 125 to remove the high frequency components caused by the mechanical vibrations of the vehicle body and the filtered output would then be converted to a voltage analogue suitable to be a reference voltage for comparing with the wheel deceleration in the comparators 23 of FIGS. 3 and 5.

Figure 7:
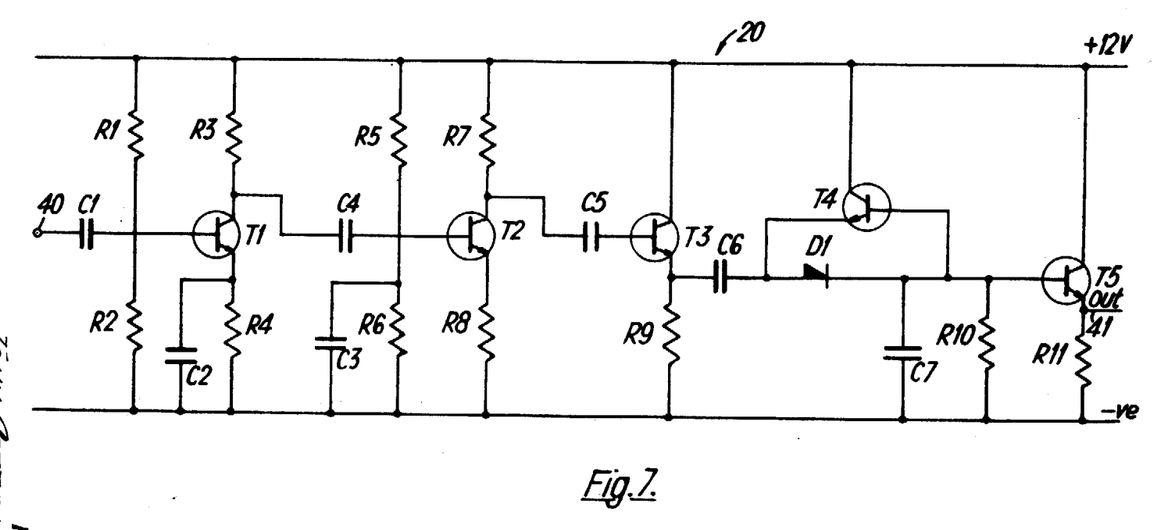

Turning now to FIG. 7, there is shown one preferred example of a circuit constituting a frequency-to-DC converter 20.

The signal from the transducer 13 is applied at 40 between the "rails" 41 of a DC power supply (not shown). The signal passed from 40 via a capacitor C1 to an amplifier stage including a NPN transistor T1 connected in the grounded-emitter configuration and having negative feedback provided by a resistor R4 which is shunted by a capacitor C2. The bias for the transistor T1 is provided by two resistors R1, R2 in series. The collector circuit of the transistor T1 includes a resistor R3.

The output of transistor T1 is passed via a blocking capacitor C4 to a second amplifier stage including a NPN transistor T2 connected in the grounded-emitter configuration, resistors R5, R6, R7, R8 and capacitor C3 which are similar in function to transistor T1, resistors R1, R2, R3, R4 and capacitor C2 respectively.

From here the amplified signal passes via a capacitor C5 to an emitter-follower stage having a NPN transistor T3 and a resistor R9 connected to its emitter. The emitter-follower stage is used to transform the high output impedance of the stage including transistor T2 to a low output impedance for the signal.

After passing through a capacitor C6, the signal goes to the diode pump circuit which includes a diode D1 connected between the emitter and the base of a NPN transistor T4. This circuit acts to convert the frequency to voltage by storing a charge proportional to the input frequency on a capacitor C7 which is shunted by a resistor R10. It will be readily understood that the voltage on capacitor C7 will be proportional to the input frequency.

The signal from the diode pump circuit passes to an output terminal 41 via a second emitter-follower stage having a NPN transistor T5 and a resistor R11 connected to the emitter thereof, this emitter-follower stage being exactly analogous to the emitter-follower stage T2-R8.

Figure 8:
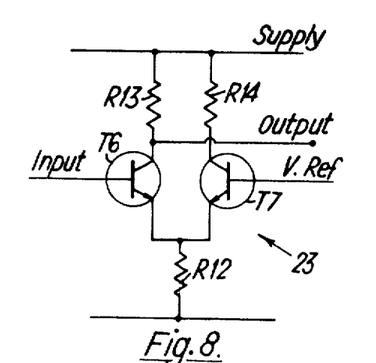

FIG. 8 shows one simple embodiment of a comparator 23 comprising two NPN transistors T6, T7 the emitters of which are coupled together and connected to earth via a resistor R12. Further resistors R13, R14 are provided in the collector circuits of the transistors T6, T7 respectively.

The base of transistor T6 arranged to receive the signal corresponding to the sensed acceleration or deceleration, while the base of transistor T7 is arranged to receive a reference signal, which may be a constant-value signal originating from e.g. the battery of the vehicle, or it may be a variable magnitude signal derived from a decelerometer secured to the vehicle body. The output signal is taken out at 45 from the collector of transistor T6.

Figure 9:
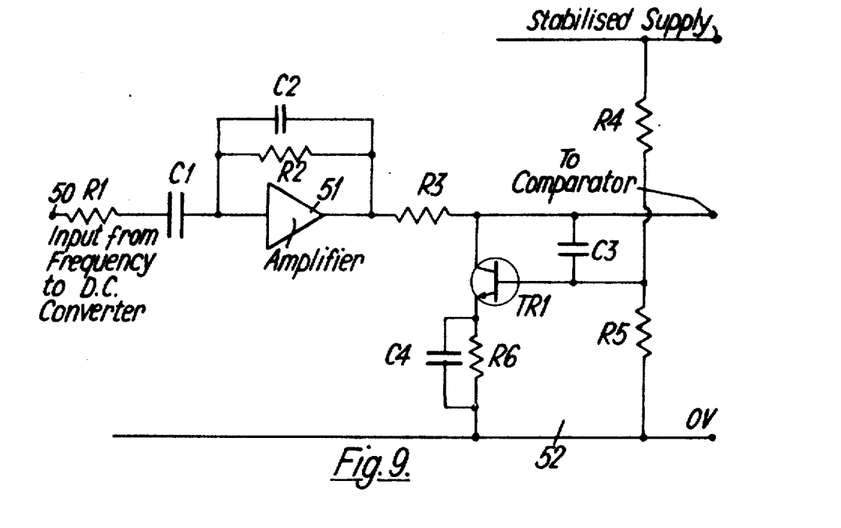
FIG. 9 is a circuit diagram of one embodiment of a differentiator and filter arrangement for use with the apparatus of the present invention.

Referring now to FIG. 9, there is shown a preferred embodiment of a circuit which constitutes the elements 21 and 22 of FIG. 3 or FIG. 5. Before particularly describing the circuit of FIG. 9, it is expedient to provide a certain amount of background information.

It will be appreciated that the output signal of the frequency-to-DC converter 20 has superimposed thereon a ripple voltage the frequency of which is, of course, related to the speed of rotation of the toothed wheel or disc 11. This ripple voltage, when differentiated, would give rise to a relatively high differential which in turn could cause a spurious indication of high wheel deceleration. It is proposed to increase from 60 to 300, say, the number of teeth on the disc 11, whereby to increase the ripple frequency and to render the circuit of FIG. 9 more suitable to deal with this ripple frequency. In describing this circuit, typical component values or makers' numbers will be given in brackets.

The 15 from the frequency-to-DC converter 20 is indicated at 50. An integrated circuit solid state inverting amplifier 51 ($\mu$A702, with an open loop gain of approximately 900) is connected to the input 50 via an input resistor R1 (8·2 K.) and an input capacitor C1 (1$\mu$F) connected in series. The operational amplifier 50 has a feedback arrangement consisting of a feedback resistor R2 (100 K.) and a feedback capacitor C2 0·1$\mu$F) connected in parallel.

In operation, the combination R2-C1 makes the operational amplifier 50 act as a differentiator for the relatively low frequency signals produced by wheel accelerations or decelerations, while the combination R1-C2 makes the operational amplifier 50 act as an integrator for the relatively high ripple frequency, whereby the ripple is attenuated. It will be noted that the time constants R1C2 and R2C1 are made approximately equal and intermediate the ripple frequency and the low frequencies due to deceleration/acceleration.

The output from the amplifier 50 still contains a small amount of ripple and this is further attenuated by being passed, via a resistor R3 (12K), to a Miller integrator circuit 52. The Miller circuit 52 includes a P-type transistor TR1 (BSY95A) the emitter circuit of which includes a resistor R6 (5·6 K.) connected in parallel with a capacitor C4(100$\mu$F) and is connected to the O volt line. A capacitor (0·22$\mu$F) is connected between the output to the comparator 23 and the base of the transistor TR1, and the latter is also connected to the junction between two series resistors R4 (22K) and R5 (3·3 K.) connected between the stabilized supply (+8·6 V.) and the 0 v. line.

It will be appreciated that the low frequency signals will not affect the transistor TR1, so that a constant current flows through the resistor R3 and thus the low frequency signals are not attenuated. However, the high frequency signals will be applied to the base of the transistor TR1 via the capacitor C3 causing the high frequency or ripple component to flow to earth through the collector of the transistor TR1 and the capacitor C4.

The use of the Miller integrator circuit produces a relatively high frequency rolloff which could only be achieved otherwise by a much bulkier and more expensive circuit arrangement.

Figure 10:
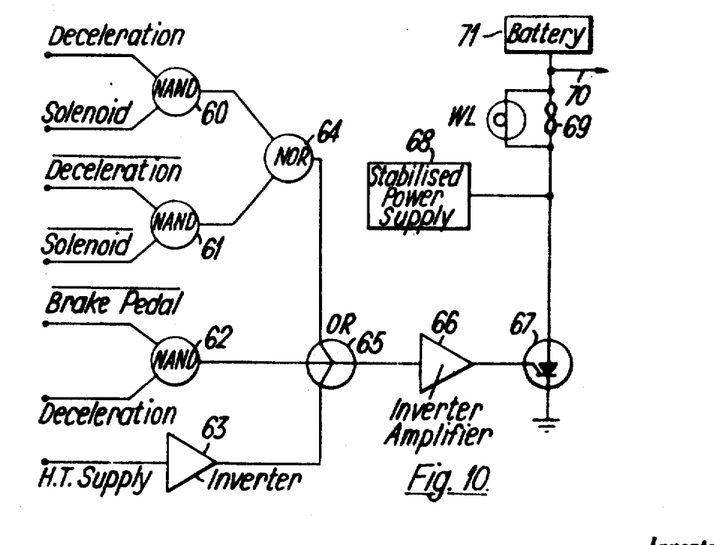
FIG. 10 is a schematic logic circuit diagram for use with a vehicle braking system in accordance with the present invention.
Figure 11:
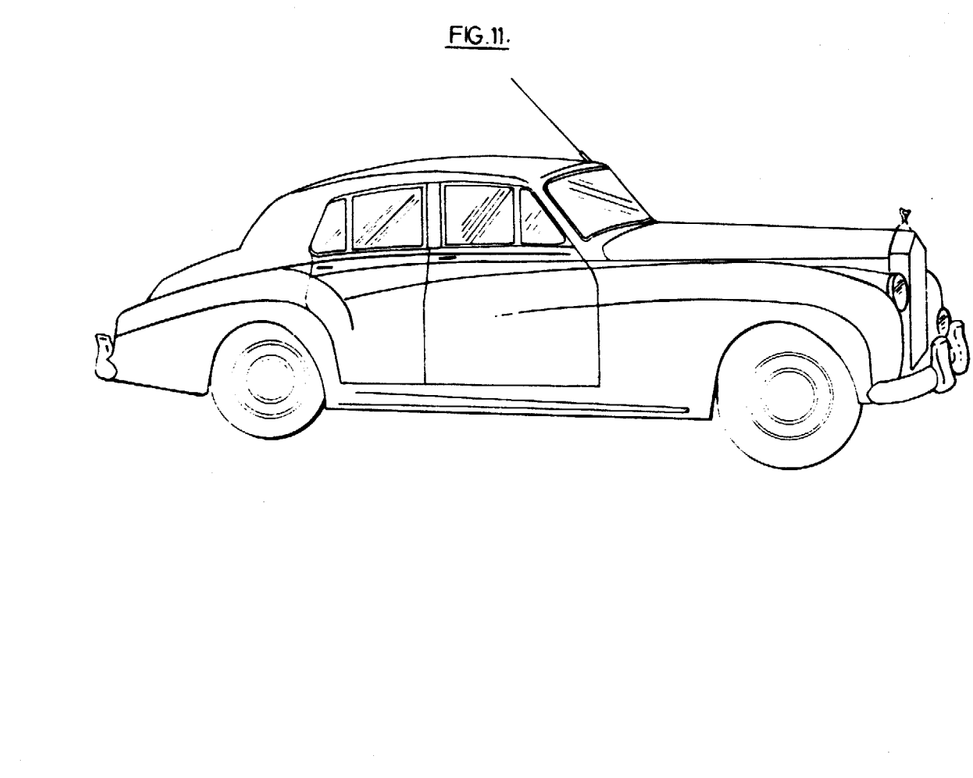
FIG. 11 is a road vehicle according to the present invention.

Referring now to FIG. 10, there is shown a logic circuit arrangement for making the vehicle braking system substantially fail-safe. The symbols and references on the diagram are explained as follows. "DECELERATION" is a high signal derived from the output of a comparator (such as comparator 23 of FIG. 8) and means that the maximum permissible deceleration has been exceeded; "SOLENOID" is a high signal derived from one of the solenoids controlling the valves described in connection with FIGS. 4 and 5, and indicates that there is present a voltage sufficient to energize the respective solenoid; "BRAKE PEDAL" is a high signal indicating that the brake pedal is not depressed. A horizontal line or bar above a symbol or reference means "NOT."

The circuit of FIG. 10 includes three NAND-gates 60, 61 and 62, of which the output sides of gates 60 and 61 are connected to a NOR-gate 64. The outputs of the NAND-gate 62 and of the NOR-gate 64 are in turn connected to a wired OR-gate 65 to which is also connected a line from an inverter 63 which is fed with a low signal representing the condition that the H.T. supply is within predetermined limits.

Thus, if there is a deceleration signal and the appropriate solenoid voltage is present, the system is working correctly in this respect and a high signal is produced at the output side of the NOR-gate 64. Similarly, if there is no deceleration signal and no solenoid voltage signal, the system is working correctly, with the appropriate output at 64. If, on the other hand, there is a deceleration signal and the brake pedal is not depressed, a low signal is produced at the output side of the NAND-gate 62.

The wired OR-gate 65 is such that if all the signals feeding into it are high, its own output is high, but if any one of its inputs is low, its own output goes low, thereby indicating a fault. This is utilized by connecting the output of the OR-gate 65, via an inverting driver amplifier 66 to a silicon-controlled rectifier (SCR) 67. When the output of the OR-gate 65 is low, the SCR 67 will switch to its conductive state.

The SCR 67 is so connected to the stabilized power supply 68 of the system, and to a fuse 69 connected in parallel with a warning lamp WL, that when conducting, it short circuits the power supply 68, blows the fuse 69 and lights up the warning lamp WL.

The diagram also shows a vehicle battery 71 and a junction 70 to which other vehicle circuits may be connected.

It will be appreciated that the present invention provides an "antiskid" system for a vehicle, e.g. a motor car, which provides a high degree of safety from the undesirable effects of skidding and consequent loss of control and which is a highly sensitive and accurate system.

Although the present invention has been described with reference to a vehicle braking system, it will be understood that by an appropriate choice of reference signals it could be adapted for indication or detection of changes in angular velocity of greater than a predetermined amount, e.g. for detection of wheel slip in rail rolling stock during acceleration. In this case, the comparator outputs could be used to reduce the drive transmitted to the relevant wheel or pair of wheels.

I claim:

1. Apparatus for indicating changes in the angular velocity of a rotating body which may be subjected to acceleration/deceleration, said apparatus comprising:
    velocity sensing means including a toothed disc at least partly made of ferromagnetic material and secured to said body for rotation therewith and a variable reluctance transducer cooperating with said disc and adapted to produce an electric signal having a frequency proportional to the angular velocity of said body,
    a converter for converting said signal to direct current signal, the level of which varies with variations in said frequency,
    a differentiator for differentiating said direct current signal, said differentiator including a circuit arrangement adapted in operation to differentiate relatively low frequency signals and to integrate relatively high frequency signals, and
    a comparator for comparing the differentiated signal with a reference signal derived from an external source, said comparator being arranged to produce an output signal whenever the two signals compared differ by at least a predetermined magnitude, said output signal being usable to actuate means adapted to reduce the acceleration/deceleration of said body.

2. Apparatus for indicating changes in the angular velocity of a rotating body which may be subjected to acceleration/deceleration, said apparatus comprising:
    velocity sensing means adapted to produce an electric signal having a frequency proportional to the angular velocity of said body,
    a converter for converting said signal to a direct current signal the level of which varies with variations in said frequency,
    a differentiator for differentiating said direct current signal, said differentiator including a circuit arrangement adapted in operation to differentiate relatively low frequency signals and to integrate relatively high frequency signals, and
    a comparator for comparing the differentiated signal with a reference signal derived from an external source, said comparator being arranged to produce an output signal whenever the two signals compared differ by at least a predetermined magnitude, said output signal being usable to actuate means adapted to reduce the acceleration/deceleration of said body, and
    wherein the said circuit arrangement includes a high gain operational amplifier, an input resistor and an input capacitor connected in series, and a feedback resistor and a feedback capacitor connected in parallel with each other and across the amplifier, the time constants of the input resistor and feedback capacitor on the one hand, and of the feedback resistor and input capacitor on the other hand being approximately equal and intermediate the said relatively low and high frequencies.

3. Apparatus for indicating changes in the angular velocity of a rotating body which may be subjected to acceleration/deceleration, said apparatus comprising:
    velocity sensing means adapted to produce an electric signal having a frequency proportional to the angular velocity of said body,
    a converter for converting said signal to a direct current signal the level of which varies with variations in said frequency,
    a differentiator for differentiating said direct current signal, said differentiator including a circuit arrangement adapted in operation to differentiate relatively low frequency signals and to integrate relatively high frequency signals,
    a comparator for comparing the differentiated signal with a reference signal derived from an external source, said comparator being arranged to produce an output signal whenever the two signals compared differ by at least a predetermined magnitude, said output signal being usable to actuate means adapted to reduce the acceleration/deceleration of said body, and
    a Miller integrator circuit which is connected to receive the output of said circuit arrangement and the output of which is passed to said comparator.

4. A vehicle having a vehicle body, four road wheels and a braking system including apparatus associated with at least some of the braked road wheels for indicating changes in the angular velocity of a wheel which may be subjected to deceleration, said apparatus comprising:
    velocity sensing means adapted to produce an electric signal having a frequency proportional to the angular velocity of said wheel,
    a first converter for converting said signal to a direct current signal the level of which varies with variations in said frequency,
    a differentiator for differentiating said direct current signal,
    a decelerometer secured to the vehicle body,
    a filter for filtering the output of the decelerometer to remove therefrom components deriving from the mechanical vibrations of the vehicle body,
    a second converter to provide a voltage analogue signal of the deceleration of the vehicle body, and
    a comparator for comparing the differentiated signal with the voltage analogue signal, said comparator being arranged to produce an output signal whenever the two signals compared differ by at least a predetermined magnitude, said predetermined magnitude being indicative of the onset of wheel-locking, said output signal being used in operation to relieve the braking force applied to said wheels.

5. A hydraulic braking system for a motor car having four braked wheels, solenoid valves being located in the said hydraulic braking system, there being at least one solenoid valve for each braked wheel, including apparatus for indicating changes in the angular velocity of a braked road wheel which may be subjected to deceleration, said apparatus comprising:
    velocity sensing means adapted to produce an electric signal having a frequency proportional to the angular velocity of said wheels,
    a converter for converting said signal to a direct current signal the level of which varies with variations in said frequency,
    a differentiator for differentiating said direct current signal,
    a comparator for comparing the differentiated signal with a reference signal derived from an external source, said comparator being arranged to produce an output signal whenever the two signals compared differ by at least a predetermined magnitude, said predetermined magnitude being indicative of the onset of wheel-locking, said output signal being used in operation to energize the said solenoid valves to relieve the braking force applied to said wheels, and wherein said hydraulic brake system includes two independent power-operated circuits and a brake pedal actuated master cylinder circuit.

6. A hydraulic braking system for a motor car having four braked wheels, solenoid valves being located in the said hydraulic braking system, there being at least one solenoid valve for each braked wheel, including apparatus for indicating changes in the angular velocity of a braked road wheel which may be subjected to deceleration, said apparatus comprising:
velocity sensing means adapted to produce an electric signal having a frequency proportional to the angular velocity of said wheel,
a converter for converting said signal to a direct current signal the level of which varies with variations in said frequency,
a differentiator for differentiating said direct current signal,
a comparator for comparing the differentiated signal with a reference to signal derived from an external source, said comparator being arranged to produce an output signal whenever the two signals compared differ by at least a predetermined magnitude, said predetermined magnitude being indicative of the onset of wheel-locking, said output signal being used in operation to energize the said solenoid valves to relieve the braking force applied to said wheels, and
a logic circuit, the said circuit being arranged to deenergize the system in case of failure and optionally to provide a warning indication also.

7. Apparatus as claimed in claim 1 wherein a filter and buffer stage is interposed between the converter and the differentiator.

8. Apparatus as claimed in claim 1 wherein the said circuit arrangement includes a high gain operational amplifier, an input resistor and an input capacitor connected in series, and a feedback resistor and a feedback capacitor connected in parallel with each other and across the amplifier.

9. Apparatus as claimed in claim 1 wherein said converter includes a diode pump circuit.

10. A vehicle braking system including apparatus for indicating changes in angular velocity as claimed in claim 1 wherein said apparatus is associated with at least some of the braked road wheels of the vehicle, said output signal being used in operation to relieve the braking force applied to said wheels, and predetermined magnitude being indicative of the onset of wheel-locking 11. A vehicle braking system as claimed in claim 10 wherein said vehicle is a motor car having four braked wheels, the arrangement for using said output signal being such that the brakes of both wheels at one end of the car are released when either wheel is about to lock at that end.

12 A vehicle braking system as claimed in claim 10 wherein said vehicle is a motor car having four braked wheels, the arrangement for using said output signal being such that the brake means of each wheel is released independently of the brake means of the other wheels when said wheel is about to lock.

13. A vehicle braking system as claimed in claim 10 wherein the motor car has a hydraulic brake system, solenoid valves being located in the said hydraulic brake system, there being at least one solenoid valve for each braked wheel, said output signal being used in operation to energize the said solenoid valves.

14. A vehicle braking system as claimed in claim 5 wherein each braked wheel is provided with at least one opposed pair of brake caliper pistons which are independently operable.

15. A vehicle braking system as claimed in claim 5 wherein the solenoid valve associated with the master cylinder is electrically controlled to operate once only for each brake application and to stay energized while the brake pedal is depressed.

16. A vehicle braking system as claimed in claim 10 wherein said reference signal is derived from a vehicle power supply independent of said sensing means.

17. A vehicle braking system as claimed in claim 16 wherein said power supply is a battery, means being provided for stabilizing its output.

18. A vehicle braking system as claimed in claim 10 wherein a decelerometer is secured to the vehicle body, and said reference signal is derived from the output signal of said decelerometer.

19. A vehicle braking system as claimed in claim 18 wherein the output signal of said decelerometer is passed through a filter to remove therefrom components deriving from the mechanical vibrations of the vehicle body and converted to provide a voltage analogue signal of the deceleration of the vehicle body, said voltage analogue signal being then passed to said comparator.